US012688431B2

(12) United States Patent (10) Patent No.: US 12,688,431 B2

Wang et al. (45) Date of Patent: Jul. 21, 2026

(54) SEQUENCE RECOMMENDATION METHOD BASED ON EXTRACTING AND MODELING OF COMPLEX MULTI-MODE USER INTERESTS

(71) Applicants: Hangzhou Dianzi University, Hangzhou (CN); HDU Binjiang Research Institute Co., Ltd., Hangzhou (CN)

(72) Inventors: Dongjing Wang, Hangzhou (CN); Xin Zhang, Hangzhou (CN); Dongjin Yu, Hangzhou (CN); Zhengzhe Xiang, Hangzhou (CN); Jianjiang Chen, Hangzhou (CN)

(73) Assignees: HANGZHOU DIANZI UNIVERSITY, Hangzhou (CN); HDU BINJIANG RESEARCH INSTITUTE CO., LTD., Hangzhou (CN)

( * ) Notice: Subject to any disclaimer, the term of this patent is extended or adjusted under 35 U.S.C. 154(b) by 449 days.

(21) Appl. No.: 18/388,885

(22) Filed: Nov. 13, 2023

(65) Prior Publication Data

US 2024/0177009 A1 May 30, 2024

(30) Foreign Application Priority Data

Nov. 29, 2022 (CN) .......................... 202211505338.3

(51) Int. Cl.
*G06N 3/086* (2023.01)
*G06N 3/098* (2023.01)

(52) U.S. Cl.
CPC ............. *G06N 3/086* (2013.01); *G06N 3/098* (2023.01)

(58) Field of Classification Search
CPC ........ G06N 3/086; G06N 3/098; G06N 3/045; G06N 3/08
USPC .......................................................... 706/13
See application file for complete search history.

(56) References Cited

U.S. PATENT DOCUMENTS

| | | | | |
|---|---|---|---|---|
| 9,317,567 | B1 * | 4/2016 | Lu ........................ | G06F 16/2465 |
| 11,941,681 | B2 * | 3/2024 | Moosaei ................ | G06N 3/084 |
| 2007/0118498 | A1 * | 5/2007 | Song ...................... | G06F 16/34 |
| | | | | 707/E17.093 |

(Continued)

*Primary Examiner* — Tung T Vo

(74) *Attorney, Agent, or Firm* — Faustino Lichauco; Leber IP Law

(57) ABSTRACT

A sequence recommendation method based on extraction and modeling of complex multi-mode user interests is provided, including: obtaining long-term and short-term embedding sequences; obtaining updated long-term and short-term embedding sequences through the long-term and short-term embedding sequences; with embedding vectors of last items in the updated long-term and short-term embedding sequences as long-term and short-term dynamic interests of a user, obtaining long-term and short-term static interests of the user through weighted calculation; concatenating the long-term and short-term dynamic interests and the long-term and short-term static interests, and performing nonlinear change to obtain long-term and short-term evolutionary interests of the user; obtaining a dynamic interest, a static interest and an evolutionary interest of the user through element-wise summation; performing weighted summation to obtain a fused user interest; calculating a product of the fused interest with embedding of each item as a recommendation score of each item.

6 Claims, 1 Drawing Sheet

(56)                    References Cited

U.S. PATENT DOCUMENTS

| | | | | |
|---|---|---|---|---|
| 2020/0134450 | A1* | 4/2020 | Chopp | G06N 3/0442 |
| 2021/0342701 | A1* | 11/2021 | Ayush | G06V 10/454 |
| 2021/0390609 | A1* | 12/2021 | Trinh | G06F 16/9535 |
| 2024/0184835 | A1* | 6/2024 | Luo | G06F 16/2237 |
| 2024/0220810 | A1* | 7/2024 | Javari | G06N 3/091 |

* cited by examiner

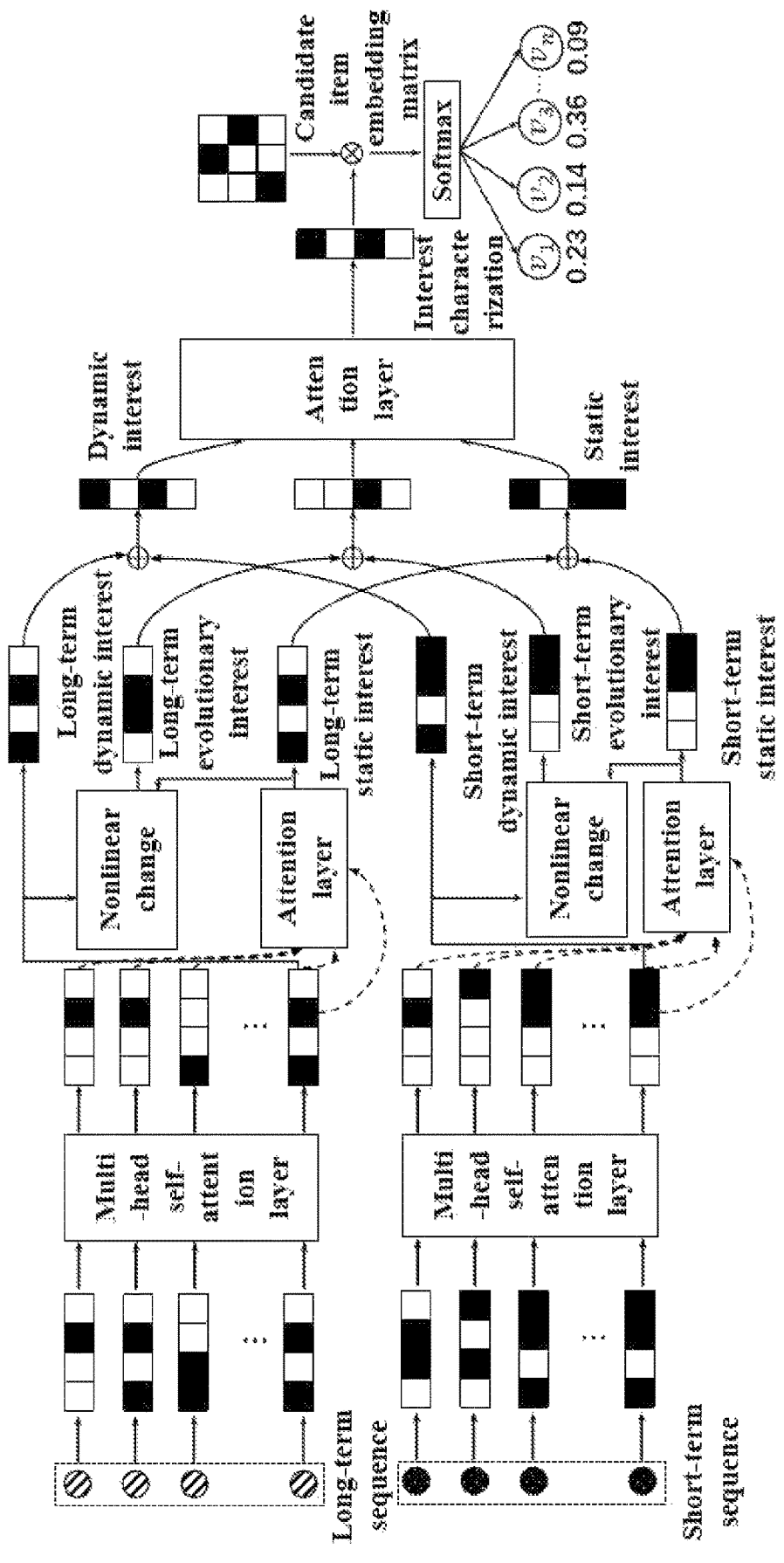

SEQUENCE RECOMMENDATION METHOD BASED ON EXTRACTING AND MODELING OF COMPLEX MULTI-MODE USER INTERESTS

CROSS-REFERENCE TO RELATED APPLICATION

This patent application claims the benefit and priority of Chinese Patent Application No. 202211505338.3 filed with the China National Intellectual Property Administration on Nov. 29, 2022, the disclosure of which is incorporated by reference herein in its entirety as part of the present application.

TECHNICAL FIELD

The present disclosure belongs to the field of data mining and recommendation systems, and in particular, relates to a sequence recommendation method based on extracting and modeling of complex multi-mode user interests.

BACKGROUND

With the rapid development of mobile computing technology, the contact between people and devices becomes easier. In the process of digitalization, massive services and data are produced, and users will inevitably face the dilemma of finding the required content from massive data, which is referred to as information overload. A personalized recommendation system solves the problem of information overload by modeling user interests and recommending related content. In particular, the personalized recommendation system can help users find products/contents/projects they are interested in from massive data and create opportunities for product providers to increase their income.

Usually, users access online items in a certain order. Therefore, sequence recommendation has become a hot topic in the construction of the recommendation system in academic circles and industry circles. Given a historical item interaction sequence of a user, sequence recommendation aims to predict a next item that the user may be interested in.

Sequence recommendation takes the sequential item interaction sequence as an input. At present, the methods of sequence recommendation by domestic and international researchers can be mainly divided into three categories, namely, matrix decomposition-based method, Markov chain-based method and deep learning-based method. The matrix decomposition-based method relies on time sequence matrix decomposition to mine dynamic interests of the user. The Markov chain-based method uses first-order or higher-order Markov chains to learn changes of long-term interests and short-term interests of the user. Inspired by the advantages of a natural language processing method in sequence modeling, the deep learning-based method is used to enhance feature learning. The method based on Convolutional Neural Network (CNN), such as Caser, uses CNN to learn an item embedding sequence. The method based on Recurrent Neural Network (RNN) uses RNN or variants of RNN such as a Gated Recurrent Unit (GRU) and a Long Short-Term Memory Network (LSTM) for sequence recommendation. Recently, because Graph Neural Network (GNN) can effectively learn a high-order relationship between items, researchers use GNN for sequence recommendation tasks. SR-GNN learns item embedding by applying GNN to graphs constructed based on item sequences. SURGE uses GNN to dynamically extract user interests from noisy sequences. In addition, the attention-based method such as SASRec uses a self-attention mechanism to adaptively select related items to model user interests. TLSAN learns long-term and short-term interests through an attention network. Generally speaking, the deep learning-based method is superior to the other two kinds of methods.

The existing sequence recommendation methods are usually divided into long-term interests and short-term interests when modeling user interests. The main difference between the long-term interest and the short-term interest lies in the different sequence lengths used for interest mining. However, with the change of the length, the user interests will also change, so that the existing methods based on long-term and short-term interests cannot accurately model the representation of the user interests.

SUMMARY

In view of the defects of the existing sequence recommendation for modeling user interests from the perspectives of long-term interests and short-term interests, the present disclosure proposes a sequence recommendation method based on extraction and modeling of complex multi-mode user interests from the perspectives of dynamic interests and static interests, and considers evolutionary interests in the dynamic and static interest modeling process to enhance feature modeling, thereby realizing more accurate personalized sequence recommendation of the user.

The present disclosure provides a sequence recommendation method based on extraction and modeling of complex multi-mode user interests, which includes the following specific steps:

Step 1, acquiring a historical item interaction sequence of a user, and selecting a latest sequence with a length of m as a long-term sequence and a latest sequence with a length of n as a short-term sequence, where m>n is required; based on a self-learning item embedding matrix $F \in \mathbb{R}^{k \times d}$, items involved in the sequences are embedded to obtain a long-term embedding sequence $F_l$ and a short-term embedding sequence $F_s$;

Step 2, inputting the long-term embedding sequence $F_l$ and the short-term embedding sequence $F_s$ into two independent multi-head self-attention modules, respectively, to obtain an updated long-term embedding sequence $\hat{E}_l$ and an updated short-term embedding sequence $\hat{E}_s$;

Step 3, with an embedding vector $$\hat{e}_l^m$$

of a last item in the updated long-term embedding sequence as a long-term dynamic interest $$p_l^d$$

of the user, calculating attention weights of the updated long-term embedding sequence $\hat{E}_l$ to the embedding vector of the last item, and performing weighted summation to obtain a long-term static interest $$p_l^s$$

of the user, and similarly, obtaining a short-term dynamic interest $$p_s^d$$

and a short-term static interest $$p_s^x$$

based on the updated short-term embedding sequence;

Step 4, concatenating the long-term dynamic interest $$p_l^d$$

and the long-term static interest $$p_l^x,$$

and performing nonlinear change to obtain a long-term evolutionary interest $$p_l^y$$

of the user, and similarly, obtaining a short-term evolutionary interest $$p_s^y$$

of the user based on the short-term dynamic interest $$p_s^d$$

and the short-term static interest $$p_s^x;$$

Step 5, obtaining a dynamic interest $p^d$ of the user through element-wise summation of the long-term dynamic interest $$p_l^d$$

and the short-term dynamic interest $$p_s^d;$$

and similarly, obtaining a static interest $p^x$ and an evolutionary interest $p^y$ of the user;

Step 6, calculating attention weights of the dynamic interest $p^d$, the static interest $p^x$ and the evolutionary interest $p^y$ to the embedding vector of the last item, and performing weighted summation to obtain a fused user interest p;

Step 7, calculating a product of p with embedding F of each item as a recommendation score of each item, and recommending top items with highest scores for the user.

The present disclosure has the following beneficial effects. The user interests are modeled from the perspectives of dynamic interests and static interests, and multi-level dynamic and static interests are modeled based on long-term and short-term sequences, so that more accurate and practical user interest modeling is realized. The difference between a dynamic interest and a static interest lies in whether the interest remains stable for a period of time. The dynamic interest changes with time, while the static interest remains almost unchanged for a period of time. In addition to dynamic and static interests, the evolutionary interest changing from the static interest to the dynamic interest is taken into account, and more accurate personalized sequence recommendation is realized by adaptive fusion of the dynamic interest. the static interest and the evolutionary interest.

BRIEF DESCRIPTION OF THE DRAWINGS

FIG. 1 is a model framework of an embodiment of a sequence recommendation method based on extracting and modeling of complex multi-mode user interests according to the present disclosure.

DETAILED DESCRIPTION OF THE EMBODIMENTS

Aiming at the defects of the current sequence recommendation method in modeling user interests from the perspectives of long-term interests and short-term interests, the present disclosure designs a sequence recommendation method based on extracting and modeling of complex multi-mode user interests.

A sequence recommendation method based on extracting and modeling of complex multi-mode user interests designed by the present disclosure will be described in detail hereinafter, and the implementation process of the method is shown in FIG. 1.

The specific steps of the present disclosure are as follows.

In step (1), sequence division and vector embedding are performed. Specifically, a historical item interaction sequence $H=(h_1, h_2, \ldots, h_t)$ of a user is acquired, where $h_i$ is an item corresponding to an i-th interaction behavior, a latest sequence $$H_l = \left( h_l^1, h_l^2, \ldots, h_l^m \right)$$

with a length of m is selected as a long-term sequence and a latest sequence $$H_s = \left( h_s^1, h_s^2, \ldots, h_s^n \right)$$

with a length of n is selected as a short-term sequence, where m>n is required. Based on a self-learning item embedding matrix $F \in \mathbb{R}^{k \times d}$, items involved in the sequences are embedded to obtain a long-term embedding sequence $$F_l = \left( f_l^1, f_l^2, \ldots, f_l^m \right)$$

and a short-term embedding sequence $$F_s = \left( f_s^1, f_s^2, \ldots, f_s^n \right),$$

where k indicates a number of kinds of all items in all sequences, where $$F_l \in \mathbb{R}^{m \times d}, F_s \in \mathbb{R}^{n \times d}, f_l^i \in \mathbb{R}^d, f_s^i \in \mathbb{R}^d,$$

and d indicates a vector embedding dimension. It is assumed that the user interaction sequence is $(a_1, a_2, a_3, a_4, a_5, a_6)$, m=6, and n=3, a long-term sequence $(a_1, a_2, a_3, a_4, a_5, a_6)$ and a short-term sequence $(a_4, a_5, a_6)$ are obtained by splitting. The long-term embedding sequence $$F_l = \left( f_l^{a_1}, f_l^{a_2}, \ldots, f_l^{a_6} \right)$$

and the short-term embedding sequence $$F_s = \left( f_s^{a_4}, f_s^{a_5}, f_s^{a_6} \right)$$

are obtained by embedding.

In step (2), embedding vectors of items are updated based on the multi-head self-attention mechanism. Specifically, the long-term embedding sequence $F_l$ and the short-term embedding sequence $F_s$ are inputted into two independent multi-head self-attention modules, respectively. Specifically, as far as the long-term embedding sequence $F_l$ is concerned, in order to learn the sequence relationship between items, a self-learning position vector $$pos_l^i \in \mathbb{R}^d$$

is assigned to each item on the sequence, and the item vector is updated to $$g_l^i = f_l^i + pos_l^i,$$

so as to obtain the long-term embedding sequence $$G_l = \left( g_l^1, g_l^2, \ldots, g_l^m \right)$$

after being updated in position. The embedding sequence combined with the position vector is learned by the multi-head self-attention mechanism. The multi-head mechanism can model different information from different spaces, thus improving the representation ability of the model. Each attention head performs independent self-attention learning. Specifically, for the j-th attention head, the following three matrices are obtained by $G_l$:

$$A^j = G_l W_A^j, B^j = G_l W_B^j, C^j = G_l W_C^j,$$

where $$W_A^j \in \mathbb{R}^{d \times d'}, W_B^j \in \mathbb{R}^{d \times d'} \text{ and } W_C^j \in \mathbb{R}^{d \times d'}$$

are three parameter matrices. Attention operation is performed to obtain the embedding sequence updated under the attention head:

$$\hat{g}_l^j = softmax\left( \frac{A^j B^{j^T}}{\sqrt{d/o}} \right) C^i,$$

where o indicates the number of attention heads. The updated long-term embedding sequence $$\hat{E}_l = \left( \hat{g}_l^1, \hat{g}_l^2, \ldots, \hat{g}_l^m \right) = \left( \hat{e}_l^1, \hat{e}_l^2, \ldots, \hat{e}_l^m \right)$$

is obtained by concatenating $$\hat{g}_l^j \in \mathbb{R}^{m \times d'}$$

obtained from o attention heads, where $$\hat{E}_l \in \mathbb{R}^{m \times (o \times d')}, \hat{e}_l^i \in \mathbb{R}^{(o \times d')}.$$

Similarly, the updated short-term embedding sequence $$\hat{E}_s = \left( \hat{e}_s^1, \hat{e}_s^2, \ldots, \hat{e}_s^n \right)$$

is obtained by the multi-head attention mechanism. For the example in Step (1), the updated long-term embedding sequence $$\hat{E}_l = \left( \hat{e}_l^{a_1}, \hat{e}_l^{a_2}, \ldots, \hat{e}_l^{a_6} \right)$$

and the updated short-term embedding sequence $$\hat{E}_s = \left( \hat{e}_s^{a_4}, \hat{e}_s^{a_5}, \hat{e}_s^{a_6} \right)$$

are obtained.

In step (3), initial dynamic and static interest modeling are performed. Specifically, an embedding vector $$\hat{e}_l^m$$

of a last item in the long-term embedding sequence $\hat{E}_l$ is taken as a long-term dynamic interest $$p_l^d$$

of a user. An attention weight of each vector in the long-term sequence to $$\hat{e}_l^m$$

is calculated:

$$\alpha_i = \frac{\exp\left(\hat{e}_l^{m^T} ReLU\left(W_i \hat{e}_l^i\right)\right)}{\sum_{j \in \{1,2,\dots,m\}} \exp\left(\hat{e}_l^{m^T} ReLU\left(W_i \hat{e}_l^j\right)\right)}$$

where $W_l \in \mathbb{R}^{(o \times d') \times (o \times d')}$ is the parameter to be trained, ReLU is an activation function, and the long-term static interest is obtained through weighted summation based on the obtained weights:

$$p_l^x = \sum_{i=1}^m \alpha_i \hat{e}_l^i.$$

Similarly, the short-term dynamic interest $$p_s^d$$

and the short-term static interest $$p_s^x$$

are obtained based on the short-term embedding sequence $\hat{E}_s$. Specifically, $$p_s^d = \hat{e}_s^n,$$

$$p_s^x = \sum_{i=1}^m \beta_i \hat{e}_s^i,$$

$$\beta_i = \frac{\exp\left(\hat{e}_s^{m^T} ReLU\left(W_s \hat{e}_s^i\right)\right)}{\sum_{j \in \{1,2,\dots,n\}} \exp\left(\hat{e}_s^{m^T} ReLU\left(W_s \hat{e}_s^i\right)\right)}.$$

For the example in step (2), the long-term dynamic interest is $$p_l^d = \hat{e}_l^{a_6},$$

and the short-term dynamic interest is $$p_s^d = \hat{e}_s^{a_6}.$$

Attention weights of $$\left(\hat{e}_l^{a_1}, \hat{e}_l^{a_2}, \dots, \hat{e}_l^{a_6}\right)$$

to $$f_l^{a_6}$$

are calculated, and then weighted summation is carried out to obtain a long-term static interest. Attention weights of $$\left(\hat{e}_s^{a_4}, \hat{e}_s^{a_5}, \hat{e}_s^{a_6}\right)$$

to $$f_s^{a_6}$$

are calculated, and then weighted summation is carried out to obtain a short-term static interest.

In step (4), initial evolutionary interest learning is performed. Specifically, the long-term dynamic interest $$p_l^d$$

and the long-term static interest $$p_l^x$$

are concatenated, and then nonlinear transformation is performed to obtain a long-term evolutionary interest of the user:

$$p_l^y = ReLU\left(W_l^y \left(p_l^d \| p_l^x\right)\right).$$

$$W_l^y \in \mathbb{R}^{(o \times d') \times (2 \times o \times d')}$$

is the parameter to be trained. Similarly, the short-term evolutionary interest $$p_s^y$$

of the user is obtained based on the short-term dynamic interest $$p_s^d$$

and the short-term static interest $$p_s^x.$$

In step (5), the dynamic interest of the user is obtained by element-wise summation of the long-term static interest $$p_l^d$$

and the short-term static interest $$p_s^d:$$

$$p^d = p_l^d \oplus p_s^d,$$

where $\oplus$ indicates element-wise addition. Similarly, the static interest $p^x$ of the user is obtained by element-wise summation of the long-term static interest $$p_l^x$$

and the short-term static interest $$p_s^x;$$

and the evolutionary interest $p^y$ of the user is obtained by element-wise summation of the long-term evolutionary interest $$p_l^y$$

and the short-term evolutionary interest $$p_s^y.$$

In step (6), interest fusion is performed. Specifically, attention weights of the dynamic interest $p^d$, the static interest $p^x$ and the evolutionary interest $p^y$ to the embedding vector $$\hat{e}_l^m$$

of the last item are calculated, which are specifically defined as:

$$\alpha_p = \frac{\exp(\hat{e}_l^m ReLU(W_f p^d))}{\exp(\hat{e}_l^m ReLU(W_f p^d)) + \exp(\hat{e}_l^m ReLU(W_f p^x)) + \exp(\hat{e}_l^m ReLU(W_f p^y))}$$

$$\alpha_x = \frac{\exp(\hat{e}_l^m ReLU(W_f p^x))}{\exp(\hat{e}_l^m ReLU(W_f p^d)) + \exp(\hat{e}_l^m ReLU(W_f p^x)) + \exp(\hat{e}_l^m ReLU(W_f p^y))}$$

$$\alpha_y = \frac{\exp(\hat{e}_l^m ReLU(W_f p^y))}{\exp(\hat{e}_l^m ReLU(W_f p^d)) + \exp(\hat{e}_l^m ReLU(W_f p^x)) + \exp(\hat{e}_l^m ReLU(W_f p^y))}$$

where weighted summation and transformation are carried out to obtain the fused user interest $p \in \mathbb{R}^d$:

$$p = W_r(\alpha_p p^d + \alpha_x p^x + \alpha_y p^y)$$

where $W_r \in \mathbb{R}^{d \times (o \times d')}$ is a parameter to be trained.

In step (7), recommendation is performed. Specifically, a product of p with embedding F of each item is calculated as a recommendation score of each item, and top items with highest scores are recommended for the user.

What is claimed is:

1. A sequence recommendation method based on extracting and modeling of complex multi-mode user interests, comprising:

Step 1, acquiring a historical item interaction sequence of a user, and obtaining a long-term embedding sequence $$F_l = (f_l^1, f_l^2, \dots, f_l^m)$$

and a short-term embedding sequence $$F_s = (f_s^1, f_s^2, \dots, f_s^n)$$

through a self-learning item embedding matrix, where m>n;

Step 2, inputting the long-term embedding sequence and the short-term embedding sequence into two independent multi-head self-attention modules, respectively, to obtain an updated long-term embedding sequence and an updated short-term embedding sequence;

Step 3, with an embedding vector of a last item in the updated long-term embedding sequence as a long-term dynamic interest of the user, calculating attention weights of the updated long-term embedding sequence to the embedding vector of the last item, and performing weighted summation to obtain a long-term static interest of the user, and similarly, obtaining a short-term dynamic interest and a short-term static interest based on the updated short-term embedding sequence, wherein:

the long-term dynamic interest $$p_l^d$$

of the user is the embedding vector $$\hat{e}_l^m$$

of the last item in the updated long-term embedding sequence $$\hat{E}_l = \left(\hat{e}_l^1, \hat{e}_l^2, \dots, \hat{e}_l^m\right),$$

that is, the long-term dynamic interest is $$p_l^d = \hat{e}_l^m,$$

and the long-term static interest is defined as:

$$p_l^x = \sum_{i=1}^{m} \alpha_i \hat{e}_l^i$$

$$\alpha_i = \frac{\exp\left(\hat{e}_t^{m^T} ReLU\left(W_l \hat{e}_l^i\right)\right)}{\sum_{j \in \{1,2,\dots,m\}} \exp\left(\hat{e}_l^{m^T} ReLU\left(W_l \hat{e}_l^j\right)\right)}$$

where $W_l \in \mathbb{R}^{(o \times d') \times (o \times d')}$ is a parameter to be trained, ReLU is an activation function, and $$\hat{e}_l^m$$

the embedding vector of the last item;
with an embedding vector $$\hat{e}_s^n$$

of a last item in the updated short-term embedding sequence $$\hat{E}_s = \left(\hat{e}_s^1, \hat{e}_s^2, \dots, \hat{e}_s^n\right)$$

as a short-term dynamic interest $$p_s^d$$

of the user, calculating attention weights of the updated short-term embedding sequence $\hat{E}_s$ to the embedding vector $$\hat{e}_s^n$$

of the last item, and performing weighted summation to obtain a short-term static interest $$p_s^x$$

of the user, specifically:
the short-term dynamic interest $$p_s^d$$

and the short-term static interest $$p_s^x$$

are obtained based on the short-term embedding sequence $\hat{E}_s$:

$$p_s^d = \hat{e}_s^n$$

$$p_s^x = \sum_{i=1}^{n} \beta_i \hat{e}_s^i$$

$$\beta_i = \frac{\exp\left(\hat{e}_s^{n^T} ReLU\left(W_s \hat{e}_s^i\right)\right)}{\sum_{j \in \{1,2,\dots,n\}} \exp\left(\hat{e}_s^{n^T} ReLU\left(W_s \hat{e}_s^j\right)\right)}$$

where $W_s \in \mathbb{R}^{(o \times d') \times (o \times d')}$ is a parameter to be trained;
Step 4, concatenating the long-term dynamic interest $$p_l^d$$

and the long-term static interest $$p_l^x,$$

and performing nonlinear change to obtain a long-term evolutionary interest $$p_l^y$$

of the user;
and similarly, obtaining a short-term evolutionary interest $$p_s^y$$

of the user based on the short-term dynamic interest $$p_s^d$$

and the short-term static interest $$p_s^x;$$

Step 5, obtaining a dynamic interest, a static interest and an evolutionary interest of the user through element-wise summation, wherein:

the dynamic interest of the user is obtained through element-wise summation of the long-term dynamic interest and the short-term dynamic interest;

the static interest of the user is obtained through element-wise summation of the long-term static interest and the short-term static interest;

the evolutionary interest of the user is obtained through element-wise summation of the long-term evolutionary interest and the short-term evolutionary interest;

Step 6, calculating attention weights of the dynamic interest, the static interest and the evolutionary interest to the embedding vector of the last item, and performing weighted summation to obtain a fused user interest;

Step 7, calculating a product of the fused user interest with embedding of each item as a recommendation score of each item, and recommending top items with highest scores for the user.

2. The method according to claim 1, wherein in Step 1, the historical item interaction sequence of the user is expressed as H=($h_1$, $h_2$, . . . , $h_t$), where $h_i$ is an item corresponding to an i-th interaction behavior; a long-term sequence is a latest $$H_l = \left(h_l^1, h_l^2, \cdots, h_l^m\right)$$

with a length of m, and a short-term sequence is a latest sequence $$H_s = \left(h_s^1, h_s^2, \cdots, h_s^n\right)$$

with a length of n; based on a self-learning item embedding matrix F∈ $\mathbb{R}^{k \times d}$, items involved in the sequences are embedded to obtain a long-term embedding sequence $$F_l = \left(f_l^1, f_l^2, \cdots, f_l^m\right)$$

and a short-term embedding sequence $$F_s = \left(f_s^1, f_s^2, \cdots, f_s^n\right),$$

where k indicates a number of kinds of all items in all sequences, where $$F_l \in \mathbb{R}^{m \times d}, F_s \in \mathbb{R}^{n \times d}, f_l^i \in \mathbb{R}^d, f_s^i \in \mathbb{R}^d,$$

and d indicates a vector embedding dimension.

3. The method according to claim 2, wherein in Step 2, the updated long-term embedding sequence $\hat{E}_l$ is defined as:

$$\hat{E}_l = \left(\hat{g}_l^1, \hat{g}_l^2, \cdots, \hat{g}_l^m\right) = \left(\hat{e}_l^1, \hat{e}_l^2, \cdots, \hat{e}_l^m\right)$$

where $$\hat{e}_l^i$$

is an embedding representation of a corresponding item i after being updated by an attention mechanism, and $$\hat{g}_l^j \in \mathbb{R}^{m \times d'}$$

is an embedding sequence obtained by a j-th attention head, which is defined as:

$$\hat{g}_l^j = softmax\left(\frac{A^j B^{j^T}}{\sqrt{d/o}}\right)C^i$$

where $$A^j = G_l W_A^j, B^j = G_l W_B^j, C^j = G_l W_C^j, G_l = \left(g_l^1, g_l^2, \cdots, g_l^m\right)$$

is a long-term embedding sequence after being updated in position, $$g_l^i = f_l^i + pos_l^i$$

is an embedding representation of the item i after being updated in position, $$f_l^i$$

is an initial embedding representation of the item i, and $$pos_l^i \in \mathbb{R}^d$$

is a self-learning position vector of the item i, where $$W_A^j \in \mathbb{R}^{d \times d'}, W_B^j \in \mathbb{R}^{d \times d'}$$

and $$W_C^j \in \mathbb{R}^{d \times d'}$$

are three parameter matrices.

4. The method according to claim 3, wherein in Step 4, the long-term evolutionary interest of the user is defined as:

$$p_l^y = ReLU\left(W_l^y\left(p_l^d \| p_l^x\right)\right)$$

where $$p_l^d$$

is the long-term dynamic interest, $$p_l^x$$

is the long-term static interest, (•|•) is a concatenation operation, and $$W_l^y \in \mathbb{R}^{(o \times d') \times (2 \times o \times d')}$$

is a parameter to be trained;
the short-term evolutionary interest of the user is defined as:

$$p_s^y = ReLU\left(W_s^x\left(p_s^d \| p_s^x\right)\right).$$

5. The method according to claim 4, wherein in Step 5, the dynamic interest $p^d$ of the user is defined as:

$$p^d = p_l^d \oplus p_s^d,$$

where $\oplus$ indicates element-wise addition, $$p_l^d$$

is the long-term dynamic interest, and $$p_s^d$$

is the short-term dynamic interest;
the static interest $p^x$ of the user is defined as:

$$p^x = p_l^x \oplus p_s^x,$$

where $\oplus$ indicates element-wise addition, $$p_l^x$$

is the long-term static interest, and $$p_s^x$$

is the short-term static interest;
the evolutionary interest $p^y$ of the user is defined as:

$$p^y = p_l^y \oplus p_s^y,$$

where $\oplus$ indicates element-wise addition, $$p_l^y$$

is the long-term evolutionary interest, and $$p_s^y$$

is the short-term evolutionary interest.
6. The method according to claim 5, wherein in Step 6, the fused user interest is defined as:

$$p = W_r\left(\alpha_p p^d + \alpha_x p^x + \alpha_y p^y\right)$$

$$\alpha_p = \frac{\exp\left(\hat{e}_l^m ReLU\left(W_f p^d\right)\right)}{\exp\left(\hat{e}_l^m ReLU\left(W_f p^d\right)\right) + \exp(\hat{e}_l^m ReLU(W_f p^x)) + \exp(\hat{e}_l^m ReLU(W_f p^y))}$$

$$\alpha_x = \frac{\exp(\hat{e}_l^m ReLU(W_f p^x))}{\exp\left(\hat{e}_l^m ReLU\left(W_f p^d\right)\right) + \exp(\hat{e}_l^m ReLU(W_f p^x)) + \exp(\hat{e}_l^m ReLU(W_f p^y))}$$

$$\alpha_y = \frac{\exp(\hat{e}_l^m ReLU(W_f p^y))}{\exp\left(\hat{e}_l^m ReLU\left(W_f p^d\right)\right) + \exp(\hat{e}_l^m ReLU(W_f p^x)) + \exp(\hat{e}_l^m ReLU(W_f p^y))}$$

where $W_r \in \mathbb{R}^{d \times (o \times d')}$ is a parameter to be trained, $p^d$ is the dynamic interest, $p^x$ is the static interest, $p^y$ is the evolutionary interest, and $$\hat{e}_l^m$$

is the embedding vector of the last item.

\* \* \* \* \*